(12) United States Patent
Porta et al.

(10) Patent No.: US 8,272,138 B1
(45) Date of Patent: Sep. 25, 2012

(54) METHOD AND APPARATUS FOR ALIGNING THE AXLE OF A VEHICLE

(76) Inventors: Scott S. Porta, Edgewater, FL (US); Michael C. Loescher, Edgewater, FL (US)

( * ) Notice: Subject to any disclaimer, the term of this patent is extended or adjusted under 35 U.S.C. 154(b) by 0 days.

(21) Appl. No.: 13/134,584

(22) Filed: Jun. 13, 2011

(51) Int. Cl.
*G01B 5/14* (2006.01)
(52) U.S. Cl. .................................. 33/288; 33/203.18
(58) Field of Classification Search ............ 33/203, 33/203.18, 288, DIG. 21
See application file for complete search history.

(56) References Cited

U.S. PATENT DOCUMENTS

| | | | | |
|---|---|---|---|---|
| 1,653,249 A | * | 12/1927 | Bennett | 33/193 |
| 3,953,134 A | * | 4/1976 | Appel et al. | 33/203.18 |
| 3,962,796 A | * | 6/1976 | Johnston | 33/288 |
| 4,440,495 A | * | 4/1984 | Bergstrom et al. | 33/288 |
| RE32,926 E | * | 5/1989 | Colby | 33/203.2 |
| 5,443,537 A | * | 8/1995 | Haskins | 33/203.18 |
| 6,718,646 B2 | * | 4/2004 | Corghi | 33/203.18 |
| 6,823,598 B1 | | 11/2004 | Loescher | |
| 7,784,191 B2 | * | 8/2010 | Knopik et al. | 33/203.18 |
| 2007/0294900 A1 | * | 12/2007 | Smith et al. | 33/203.18 |
| 2008/0289202 A1 | * | 11/2008 | Kassouf et al. | 33/288 |
| 2010/0229411 A1 | * | 9/2010 | Lai | 33/458 |

* cited by examiner

*Primary Examiner* — G. Bradley Bennett
(74) *Attorney, Agent, or Firm* — William M. Hobby, III

(57) ABSTRACT

An apparatus and method of aligning a vehicle's fixed rear axle relative to the vehicle frame and suspension elements uses an adjustable axle housing shim between one end of the axle housing and a leaf spring. One end of the axle is moved by the adjustable axle housing shim to remove any skew in the axle and wheels.

10 Claims, 2 Drawing Sheets

METHOD AND APPARATUS FOR ALIGNING THE AXLE OF A VEHICLE

BACKGROUND OF THE INVENTION

The present invention relates to an apparatus and a method of aligning a vehicle's axles and especially to a method and apparatus for aligning a fixed axle relative to the frame and suspension elements of the vehicle.

A proper aligned front end of a vehicle has long been a necessity for long tire life, handling ease and for achieving optimal fuel economy. The vehicle wheels need to travel in a straight line, with all wheels pointing in the same direction. That is, all four wheels must be square to each other and square to the road surface. All four wheels need to be parallel to one another and perpendicular to a common center line with the wheels straight up and down.

Full attention has generally focused on the alignment of the front wheels. However, a misaligned rear axle also results in reduced tire life and reduced fuel economy. A misaligned rear axle causes excessive tire drag and creates undesirable lateral forces. Even in new trucks, studies have shown that most are in need of rear axle alignment to align the rear axle relative to the suspension element and rear tires relative to each other and frame of the vehicle. The vehicle wheels need to be parallel to one another. Because of the increased tire wear and reduced fuel economy, even small misalignments of the rear axle become particularly important for freight carrying vehicles that must travel long distances. However, obtaining the proper alignment in an assembly line setting is difficult as are the minute adjustments that must be made quickly and accurately.

The present invention is directed towards the correction of fixed axle skew which is when the rear axle cocks slightly sideways causing both the rear tires of the vehicle to point slightly in the wrong direction or in a slightly different direction from the front wheels. In addition, if a fixed axle housing is slightly bent, one wheel will have skew relative to the other wheels which will also increase tire wear on the one wheel while reducing fuel economy in the vehicle.

The thrust line in a vehicle is an imaginary line created by the direction in which the rear wheels are pointing. The difference between an imaginary line drawn down the center of the vehicle and the thrust line equals the thrust angle. The thrust angle or axle offset causes both rear tires to point in the wrong direction and creates skew in the rear wheel assembly.

It has been common to perform a front end alignment using laser based wheel alignment systems. The axis about which the front wheels of an automobile or truck turn as it travels down the road must be carefully set to minimize tire wear, for safety and for stable handling characteristics. The orientation of these axes is determined by three angles. The toe-in angle, which specifies the angle between the rim of the wheels and a line drawn parallel to the direction in which the vehicle is pointed and the camber angle, which specifies the angle between the rim of the wheels and vertical and the caster angle, which specifies the angle between the vertical and the axis about which individual wheels turn when changing direction. These angles are specified individually for each wheel for each model and make of a vehicle. It must be periodically tested and reset to ensure continued economic and safe vehicle performance. However, in addition to front wheel alignment, it is desirable to set the thrust angle of the rear axle to avoid rear axle skew and also to ascertain that the rigid axle is not slightly bent to thereby cause skew in one of the rear wheels. In addition, the rear toe can also be adjusted.

The present invention is directed to correcting the thrust of a rear or any fixed axle to reduce small amounts of skew in the wheels and to thus prolong tire wear and improve fuel economy. A laser alignment system is used for aligning both the front wheels and the rear axle in which a laser is attached to each vehicle wheel spindle or hub, as set forth in the Loescher U.S. Pat. No. 6,823,598.

SUMMARY OF THE INVENTION

The present invention relates to a laser alignment system and especially to rear axle alignment to eliminate skew in the axle and wheels. A vehicle axle housing shim has a shim block having a tie bolt hole therein for receiving a tie bolt therein. The shim block is shaped to fit between a vehicle axle housing and a leaf spring. A pair of axle housing engaging lips are movably attached to opposite sides of the shim block and spaced therefrom and movable relative thereto. Each axle engaging lip has at least one threaded member passing therethrough and threaded into the shim block. The axle engaging lip is threadedly moved to move the axle housing relative to the leaf spring and vehicle chassis. Each axle engaging lip typically has a pair of threaded members passing therethrough and has a generally L-shaped cross-section holding the axle housing between the axle engaging lips. The leaf spring tie bolt extends through a leaf spring and into the shim block tie hole for holding the leaf spring relative to the movement of the axle housing by the axle housing engaging lips.

A method of adjusting the skew of a vehicle fixed axle includes the step of selecting an adjustable vehicle axle housing shim having a shim block having a tie hole therein for receiving a tie bolt passing through the leaf spring and having a pair of axle engaging lips, each axle engaging lip being attached to and spaced from an opposing side of the shim block and moveably relative to the shim block to form an adjustable axle housing shim for moving a vehicle axle housing relative to the spring. The selected vehicle axle housing shim is attached between a vehicle axle housing and a vehicle leaf spring and the engaging lip is moved relative to the shim block to move the axle housing relative to the leaf spring to adjust the skew of a vehicle axle. The method includes the step of selecting and attaching a fixed axle shim between the axle housing and a leaf spring on the opposite end portion of the axle housing from the adjustable shim to thereby lift both axle springs relative to the vehicle axle housing. The method also includes rotating at least one shim block axle engaging lip threaded member to move the axle housing to adjust the skew of the axle housing. The method includes the step of attaching a laser to the axle housing or axle having an adjustable shim and positioning a target to measure the skew in the axle housing for adjusting the vehicle axle skew.

BRIEF DESCRIPTION OF THE DRAWINGS

The accompanying drawings which are included to provide a further understanding of the invention are incorporated in and constitute a part of the specifications to illustrate an embodiment of the invention and, together with the description, serve to explain the principles of the invention.

In the Drawings

FIG. 4, is a perspective view of an adjustable shim in accordance with the present invention; and FIG. 5 is a perspective view of a fixed shim for use with the present invention.

DETAILED DESCRIPTION OF THE EXEMPLARY EMBODIMENTS

Figure 1:
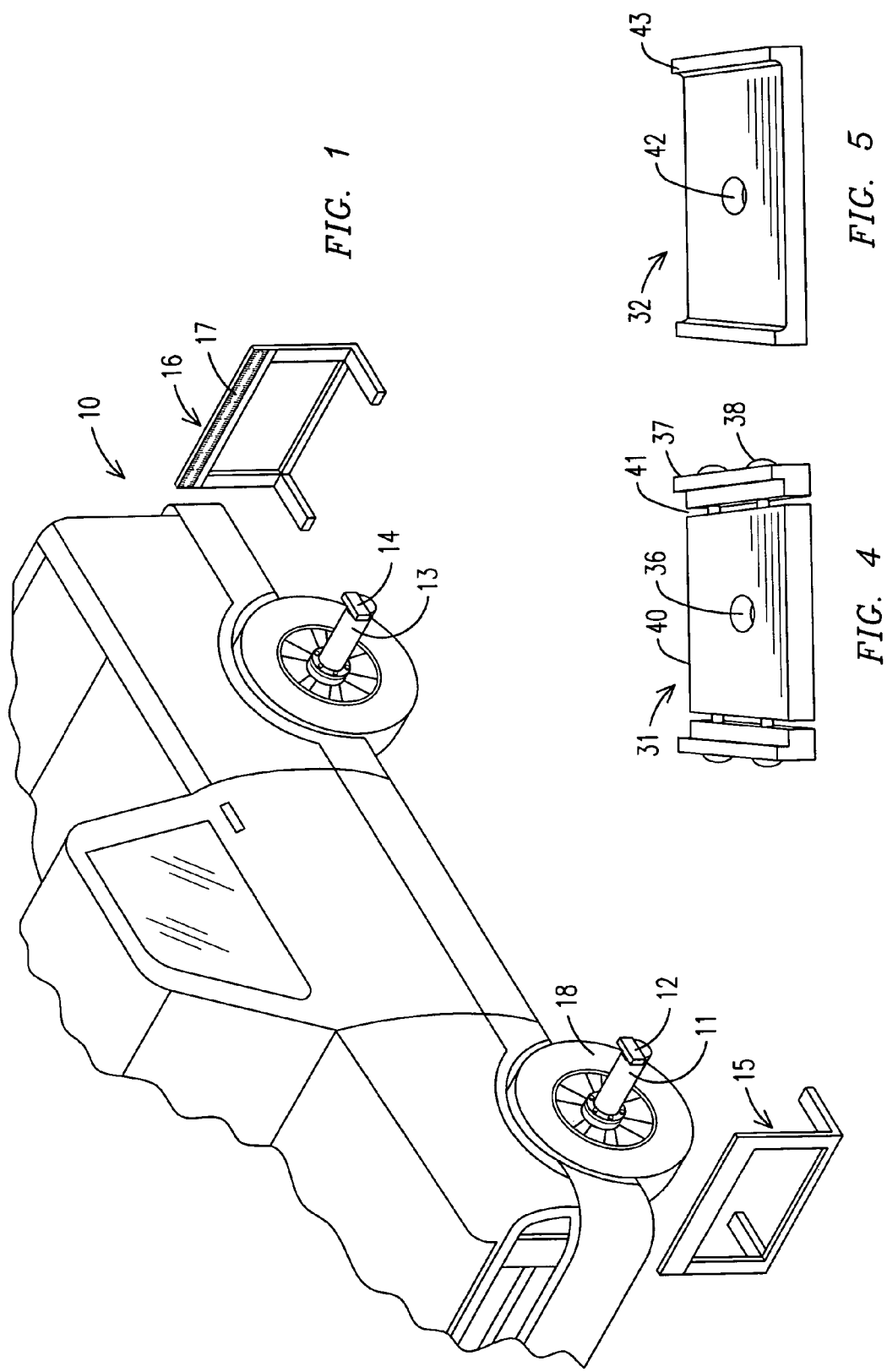
FIG. 1 is a partial perspective view of a truck having a laser alignment system attached thereto, and targets therefor.

Referring to FIG. 1, a pickup truck 10 is illustrated having a laser supporting attachment 11 attached to a vehicle front wheel spindle or hub for supporting a laser 12. A laser supporting attachment 13 is attached to the rear axle spindle or hub and supports a rear axle laser 14. Lasers are attached to all four wheels of the vehicle during the alignment of the wheels and axles. The laser supporting attachments 11 and 13 for the vehicle wheel hub use the laser supporting attachment for a vehicle alignment system in accordance with the Loescher patent, U.S. Pat. No. 6,823,598. The target 15 is mounted in front of the vehicle 10 while a rear target 16 is mounted to the rear of a vehicle. Each target has a series of target gradations 17 thereon to which the light from lasers 12 and 14 are directed. During the laser alignment of the vehicles wheels 18, the front wheels are aligned for a caster, camber and toe and are aligned in accordance with the specifications for the vehicle to adjust the angles of the wheels so that they are set to the car maker's specifications. The use of a laser alignment system using lasers and targets allows for a more precise front end and rear end alignment for the wheels of the vehicle. The lasers are also used to indicate the thrust angle of a fixed or rear axle of the truck 10. The thrust angle is the angle between an imaginary line created by the direction in which the rear wheels point and an imaginary line drawn down the center of the vehicle. If the fixed axle is slightly askew, the tires will be aimed at an angle to the left or right of the imaginary center line. This skew of the rear wheels increases tire wear and reduces vehicle fuel mileage.

Figure 2:
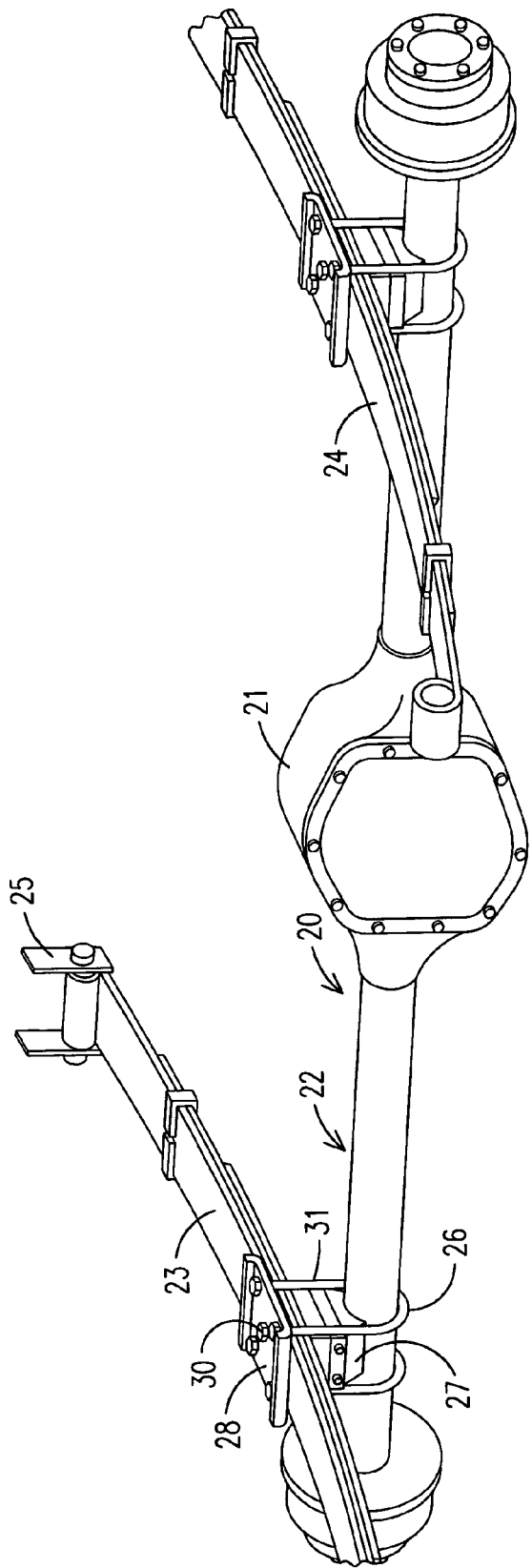
FIG. 2 is a partial perspective view of a vehicle rear axle having an adjustable shim in accordance with the present invention attached between a leaf spring and the axle housing.

Turning to FIG. 2, a fixed rear axle 20 has a differential 21 therein and has a fixed rear axle housing 22 extending from the differential. The axle housing 22 is held at each end to the leaf springs 23 and 24. The leaf springs in turn are attached to the chassis of the vehicle and holds the fixed axle 20 to the vehicle chassis through the leaf springs 23 and 24, one end of each leaf spring is mounted to the chassis with a shackle 25 to allow for the movement of the leaf springs 23 and 24. The leaf springs are attached to the axle housing 22 using a pair of U-bolts 26 which extend around the axle housing 22 and an axle perch 27 and over the springs 23 and 24 and are bolted to a spring perch 28. A tie bolt 30 extends through the perch 28 and through the leaf springs 23 and normally extends to the axle housing perch 27 to hold the axle housing in position with the leaf springs.

Figure 3:
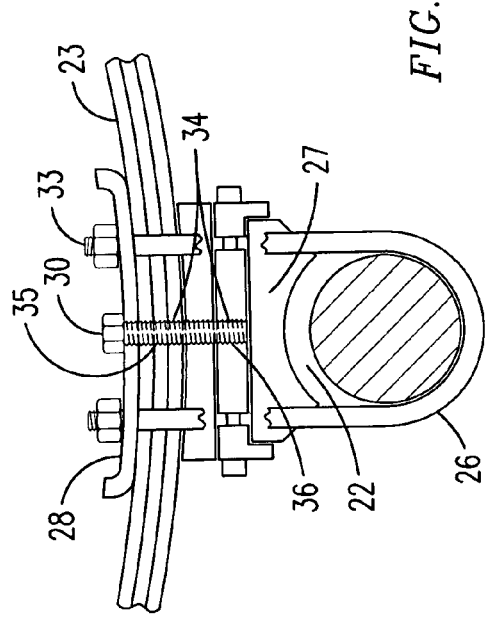
FIG. 3 is a sectional view of an adjustable axle housing shim attached between the leaf spring and an axle housing of the present invention.

In the present invention, as seen in FIGS. 2 and 3, an axle adjusting shim 31 is placed between the axle housing 22 and the leaf spring 23 and sits on the axle housing perch 27. The tie bolt 30 extends into the adjustable shim 31 but not into the axle housing perch 27. Similarly on the opposite end of the axle 20, a fixed spacing shim 32 is placed between the axle housing and the leaf spring 24 to thereby maintain equal spacing between the axle housing and the leaf springs on both sides of the axle.

As more clearly seen in FIGS. 3, 4 and 5, the adjustable shim 31 has been placed between the axle housing perch 27 and the leaf spring 23 and is held in place by the U-bolts 26 extending around the axle housing 22 and bolted over the leaf spring 23 to the spring perch 28 with nuts 33 for tying the axle housing and axle to the chassis of the vehicle. The tie bolt 30 is shown extending through a tie hole 34 in the spring perch 48 and through the bore 35 in the spring 23 and into the tie hole 36 for the adjustable shim 31. The bolt 30 does not extend into the axle perch 27. The adjustable shim 31 has a pair of axle engaging lips 37 on each side thereof, each having a generally L-shaped cross-section and each having a pair of threaded members 38 extending therethrough and threaded into the shim block 40 having the tie hole 36 going through the center thereof. Each axle adjusting lip 37 is spaced by a space 41 from the shim block 40. Rotating the thread members 38 into and out of the shim block 40 removes the axle engaging lip to move the axle housing 22 at one end of the axle relative to the other end of the axle.

In FIG. 3, one of the lips moves against the axle housing perch 27 while moving closer to the shim block 40 to move the axle housing along with the axle relative to the leaf spring 23.

When the axle is slightly askew forming a thrust angle with the rear wheels of the vehicle, the movement of one end of the axle brings the fixed axle into alignment. The wheels are brought into alignment with the front wheels to eliminate any slippage or drag by the rear wheels being at a slight angle to the front wheels which increases tire wear and reduces vehicle fuel mileage.

FIG. 5 shows the fixed shim 32 having a tie hole 42 therethrough having a pair of lips 43 on either edge thereof for mounting between the axle housing 22 and spring 24 to space the axle housing from the spring 24 an equal distance to the spacing between the axle housing 22 and the leaf spring 23.

The process of the present invention for adjusting the skew of a vehicle axle includes the steps of selecting a vehicle axle housing shim 31 having a shim block 40 having a tie hole 36 therethrough for receiving a tie bolt 30. The selected shim block has a pair of movable axle engaging lips 37. Each axle engaging lip 37 is spaced from and movable relative to the shim block 40. The selected axle housing shim 31 is attached between the vehicle rear axle housing 22 and a leaf spring 23 at one end of the axle. The other end of the axle 20 where the adjustable shim 31 is mounted has a fixed shim 32 mounted between the axle housing and leaf spring 24.

The process also includes the adjustable axle housing shim 31 axle engaging lip 37 having a threaded member passing therethrough and into the shim block 40 to allow each axle engaging lip 37 to be moved relative to the shim block 40 by rotation of the threaded members and thereby moving the axle housing 22 relative to the vehicle spring 23. The process includes rotating at least one shim block axle engaging lip threaded member to move one end of the axle housing to adjust the skew in the axle housing 22. The process may include the attaching of a laser 14 to the axle housing of an adjustable shim block 31 and positioning a target 16 to measure the skew in the axle housing for adjusting the vehicle axle skew with the axle adjusting shim 31.

It should be clear at this point that an adjustable vehicle axle housing shim has been provided for adjusting the skew in a fixed axle along with a method of adjusting the skew of a vehicle fixed axle using an adjustable shim mounted to one side of a fixed axle of a vehicle and adjusting the position of one end of the axle relative to the other end to provide an accurate alignment of the rear axle for improving the handling of the vehicle along with the reduced tire wear and improved fuel mileage.

However, the present invention is not to be considered as limited to the embodiments shown which are to be considered illustrative rather than restrictive.

We claim:

1. A vehicle axle housing shim comprising:
a shim block having a tie hole therein for receiving a spring tie bolt therein, said shim block being shaped to fit between a vehicle axle housing and leaf spring; and
a pair of axle engaging lips, each axle engaging lip being movably attached to an opposing side of said shim block and spaced therefrom and being movable relative to said shim block, each said axle engaging lip having at least one threaded member passing therethrough and threaded into said shim block so that rotating the axle engaging lip threaded member moves the axle engaging lip to move the axle housing relative to the shim block and leaf spring.

2. The vehicle axle housing shim in accordance with claim 1 in which each said axle engaging lip has a pair of threaded members passing therethrough and into said shim block.

3. The vehicle axle housing shim in accordance with claim 2 in which said shim block is shaped to fit between an axle housing perch and a leaf spring and said pair of axle engaging lips extend over each side of said axle housing perch for moving said axle housing perch and axle housing relative to said leaf spring when moving one said axle engaging lip thereagainst.

4. The vehicle axle housing shim in accordance with claim 3 in which each said axle engaging lip has a generally L-shaped cross-section positioned to cradle said axle housing perch therebetween.

5. The vehicle axle housing shim in accordance with claim 4 in which a leaf spring tie bolt extends through a leaf spring into said shim block tie hole for holding shim block to said leaf spring while moving said axle housing relative to said leaf spring upon movement of one of said axle engaging lips to move the axle housing relative to the leaf spring.

6. A method of adjusting the skew in a vehicle axle comprising the steps of:
selecting a vehicle axle housing shim having a shim block having a tie hole therein for receiving a spring tie bolt and having a pair of axle engaging lips, each axle engaging lip being spaced from and movably attached to an opposing side of the shim block and movable relative thereto to form an adjustable axle housing shim for moving a vehicle axle housing relative to its leaf spring;
attaching said selected axle housing shim between a vehicle axle housing and a vehicle leaf spring; and moving one said axle engaging lip relative to said shim block to move said axle housing relative to said leaf spring to adjust the skew of a vehicle axle.

7. The method of adjusting the skew in a vehicle axle in accordance with claim 6 including the step of selecting and attaching a second axle shim between said axle housing and a leaf spring on the opposite end portion of said axle housing from said adjustable axle shim to thereby lift both axle springs relative to the vehicle axle housing.

8. The method of adjusting the skew in a vehicle axle in accordance with claim 7 in which said selected adjustable axle housing shim axle engaging lip has a threaded member passing therethrough and into said shim block to allow each axle engaging lip to be moved relative to said shim block by the rotation of said threaded member for moving the axle housing relative to the vehicle spring.

9. The method of adjusting the skew in a vehicle axle in accordance with claim 8 including the step of adjusting at least one shim block axle engaging lip threaded member to thereby move the axle housing to adjust the skew in the axle housing.

10. The method of adjusting the skew in a vehicle axle in accordance with claim 9 including the step of attaching a laser to the axle housing of an axle housing having an adjustable shim block therein and positioning a target to measure the skew in the axle housing for adjusting the vehicle axle skew with said axle adjusting shim.

* * * * *